United States Patent
Barba et al.

(10) Patent No.: US 9,336,192 B1
(45) Date of Patent: May 10, 2016

(54) METHODS FOR ANALYZING TEXT

(71) Applicant: Lexalytics, Inc., Amherst, MA (US)

(72) Inventors: Paul F. Barba, South Hadley, MA (US);
Michael W. Marshall, Norwich (GB);
Carl J. Lambrecht, Mansfield, MA (US)

( * ) Notice: Subject to any disclaimer, the term of this patent is extended or adjusted under 35 U.S.C. 154(b) by 273 days.

(21) Appl. No.: 14/090,271

(22) Filed: Nov. 26, 2013

Related U.S. Application Data

(60) Provisional application No. 61/730,548, filed on Nov. 28, 2012.

(51) Int. Cl.
*G06F 17/27* (2006.01)

(52) U.S. Cl.
CPC ..................... *G06F 17/27* (2013.01)

(58) Field of Classification Search
CPC ... G06Q 50/01; G06F 17/2785; G06F 17/277; G06F 17/30312; G06F 17/30619; G06F 17/30625
USPC ......... 704/9; 709/224, 206; 707/812; 706/27, 706/20; 705/14.23, 14.17; 434/157
See application file for complete search history.

(56) References Cited

U.S. PATENT DOCUMENTS

| | | | |
|---|---|---|---|
| 6,622,140 B1 | 9/2003 | Kantrowitz | |
| 7,089,504 B1 | 8/2006 | Froloff | |
| 7,225,122 B2 | 5/2007 | Shaw | |
| 7,289,949 B2 | 10/2007 | Warner et al. | |
| 7,406,503 B1* | 7/2008 | Little, II | G06Q 10/107 709/206 |
| 7,434,176 B1 | 10/2008 | Froloff | |
| 7,565,404 B2 | 7/2009 | Gwozdz | |
| 7,574,411 B2* | 8/2009 | Suontausta | G06F 17/30625 704/231 |
| 7,640,304 B1 | 12/2009 | Goldscheider | |
| 7,752,159 B2 | 7/2010 | Nelken et al. | |
| 7,810,033 B2 | 10/2010 | Cordes et al. | |
| 7,983,701 B2 | 7/2011 | Bell et al. | |
| 8,041,669 B2 | 10/2011 | Nigam et al. | |
| 8,078,453 B2 | 12/2011 | Shaw | |
| 8,136,944 B2 | 3/2012 | De Lemos | |
| 8,170,872 B2 | 5/2012 | Lyle | |
| 8,463,595 B1* | 6/2013 | Rehling | G06F 17/30864 704/9 |
| 2005/0010560 A1* | 1/2005 | Altevogt | G06F 17/30619 |
| 2005/0114142 A1 | 5/2005 | Asukai et al. | |
| 2006/0129927 A1 | 6/2006 | Matsukawa | |
| 2006/0242424 A1 | 10/2006 | Kitchens et al. | |
| 2008/0056470 A1 | 3/2008 | Chiu et al. | |
| 2008/0096532 A1 | 4/2008 | Lyle et al. | |
| 2009/0063154 A1 | 3/2009 | Gusikhin et al. | |
| 2009/0164888 A1 | 6/2009 | Phan | |
| 2009/0248399 A1 | 10/2009 | Au | |
| 2010/0262454 A1* | 10/2010 | Sommer | G06Q 30/02 706/20 |
| 2011/0010173 A1 | 1/2011 | Scott et al. | |
| 2011/0173191 A1 | 7/2011 | Tsaparas et al. | |
| 2011/0184721 A1 | 7/2011 | Subramanian et al. | |

(Continued)

FOREIGN PATENT DOCUMENTS

| | | |
|---|---|---|
| CA | 2 398 608 | 6/2001 |
| DE | 60209420 | 9/2006 |

(Continued)

*Primary Examiner* — Michael Colucci
(74) *Attorney, Agent, or Firm* — Doherty, Wallace Pillsbury & Murphy

(57) ABSTRACT

A method for analyzing sentiment in media, topic targeted sentiment, and semantic vector calculation explanation functions.

2 Claims, 9 Drawing Sheets

(56) References Cited

U.S. PATENT DOCUMENTS

| | | |
|---|---|---|
| 2011/0258213 A1 | 10/2011 | Pollara |
| 2012/0047447 A1 | 2/2012 | Haq |
| 2012/0115112 A1* | 5/2012 | Purushotma ............ G09B 19/06 434/157 |
| 2012/0136985 A1* | 5/2012 | Popescu ................ G06Q 50/01 709/224 |
| 2012/0182309 A1 | 7/2012 | Griffin et al. |
| 2012/0245987 A1* | 9/2012 | Isaacson ............... G06Q 30/06 705/14.23 |
| 2012/0303430 A1* | 11/2012 | Tiku ..................... G06Q 20/387 705/14.17 |
| 2013/0018968 A1* | 1/2013 | Pennacchiotti ........ G06Q 10/10 709/206 |
| 2013/0103386 A1* | 4/2013 | Zhang ................ G06F 17/2785 704/9 |
| 2015/0100527 A1* | 4/2015 | Ryan ..................... H04L 51/12 706/20 |
| 2015/0120788 A1* | 4/2015 | Brun ................. G06F 17/30312 707/812 |
| 2015/0149153 A1* | 5/2015 | Werth ................ G06F 17/2785 704/9 |

FOREIGN PATENT DOCUMENTS

| | | |
|---|---|---|
| EP | 1535174 | 6/2005 |
| JP | 2001-209964 | 12/2002 |
| JP | 2006-038228 | 8/2007 |
| JP | 2010272075 | 12/2010 |
| JP | 2010282312 | 12/2010 |
| WO | 02/44991 | 6/2002 |
| WO | 2007/014203 | 2/2007 |
| WO | 2007/035142 | 4/2007 |

\* cited by examiner

METHODS FOR ANALYZING TEXT

BACKGROUND OF THE INVENTION

1. Field of the Invention

The present disclosure relates generally to textual analytics. More specifically, the disclosure relates to analysis of sentiment, topic targeted sentiment, and semantic vector calculation explanation functions.

2. Background of the Invention

An important part of text analytics at present is the processing of text to determine the sentiment of a writer towards his topics. People hold opinions about products, companies, people and events that are often revealed, intentionally or not, by how they discuss these topics. By analyzing sentiment in aggregate, a great deal can be learned about the world.

However, much of the writing available today does not work well with traditional sentiment algorithms. Social media is a highly informal and terse medium. Improper grammar and spelling provides unique challenges to sentiment algorithms in this space. Additionally, the terseness inherent in very short form content such as tweets and text messages often hides implicit and explicit messages. In such a "noisy" environment, new techniques are necessary for exploiting all of the available information.

A single, cohesive written work regularly spans multiple topics, especially distinct but similar topics. Each topic may be treated slightly differently by the author, referencing different themes and entities and with different sentiment implied. For the field of Text Analytics, understanding the relationship between individual topics and calculated metadata provides a more in depth view of what exactly is being said. Additionally, the consumer of Text Analytics analysis may have more limited interest than all the ideas being communicated in an article. For example, they may be a corporation concerned only with their own business domain. Alternatively, they may be interested only in topics directly connected with them. Thus, an algorithm to understand the scope of topics and their interactions with other metadata can produce more focused results for the end user.

A number of techniques exist to transform a corpus of text into a matrix representation of the semantic relationships between terms and phrases in the corpus, in order to provide some degree of semantic knowledge to various text analytics processes. In general, a tf-idf variant is used to encode the relationships between terms and documents. Various operations then may be performed on the matrix, such as, multiplying the matrix by its own inverse, taking the eigenvectors of the matrix, or clustering the data. The final, transformed matrix can be used to compare arbitrary pieces of text by finding the vectors corresponding to the content of each segment of text, combining them with some operator to form a single vector representation of the entire text, then using a measure of vector distance, such as the cosine similarity between vectors, to obtain a numerical distance value between the two pieces of text.

While effective, this process can also be opaque. The engine is able to defend its decision to match pieces of text only by reference to similarities between vectors. The interpretations of what each column means may be limited, such as "both texts contained terms that appeared in a particular news story in the training data" or incomprehensible except mathematically when more transformations occurred. Among other issues, this makes it significantly harder to fix misunderstandings by the engine, since it is not always clear where the misunderstanding is coming from.

BRIEF SUMMARY OF THE INVENTION

The above discussed problems are alleviated by or greatly reduced by the use of a Named Entity Recognizer on the hashtags of a message, where matching Named Entities are assumed to be related to any sentiment bearing terms in the entire message, bypassing standard techniques that attempt to assign sentiment only to Named Entities clearly related to said term, such as those Named Entities sharing a subject verb object relationship with said term.

The invention further relates to a method for providing text analytics metadata at the resolution of topics within a document achieved by providing a text analytics engine with a list of topic queries and a document where the engine then performs its regular metadata extraction procedures on the document and performs topic identification based on the provided topic queries, then identifies the sentences most highly correlated with each matching topic, then optionally expands this set of sentences with other sentences closely matching the original set of sentences via a semantic similarity metric, and then provides for each topic the metadata occurring only in the selected sentences and optionally recomputes secondary metadata on the first set of metadata only within the selected sentences.

The invention also relates to a method for enhancing the output of a Semantic Matrix by initializing the original constituent vectors representing a document with a credit matrix, assigning full credit for each nonzero weighted column in the vector to the term, n-gram or defined term pattern that generated this vector and applying complementary credit matrix operations for every vector operation used in building compound semantic representations in order to support ranking of original tennis, n-grams or defined term patterns by contributions to any semantic calculation.

DETAILED DESCRIPTION OF THE INVENTION

Definitions

Figure 1:
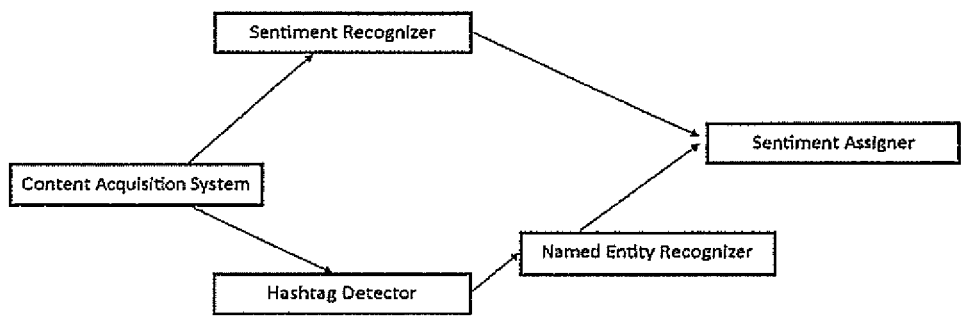
FIGS. 1-5 are diagrams depicting exemplary pathways for analyzing sentiment per an exemplary embodiment.

Hashtag—A word or phrase proceeded by a hash (#) symbol without any spaces, used as a general communication mechanism in certain communication mediums. An example is: #food.

Run-on Hashtag—A hashtag consisting of a phrase, that is, a series of two or more words not separated by spaces and following a hash (#) symbol. An example is: #firstworldproblems.

Text Analytics Algorithm—A piece of code used for determining answers to specific questions of meaning in electronic documents either for direct consumption by users of Text Analytics software or as building blocks for other Text Analytics Algorithms. Unless otherwise noted, Text Analytics algorithms make use of one or more of the following techniques: manual encoding of human knowledge, machine learning to generalize rules from human annotated corpuses, and machine learning to determine statistical relationships from unannotated corpuses.

Tokenizer—A Text Analytics Algorithm that determines the boundaries of words and sentences within a document.

Part of Speech Tagger—A Text Analytics Algorithm that takes the boundaries of words from a Tokenizer and further computes the parts of speech, the grammatical roles of individual words, for each word.

Named Entity—Distinguishable participants in a document of a particular variety, commonly including e.g., people, organizations, places, products, and amounts. Other entity types are often used as well in Text Analytics systems, especially domain specialized ones such as chemicals or accounting categories. Examples include "Barack Obama", "Burger King", "Alaska" and "iPhone 4S".

Named Entity Recognizer—A Text Analytics Algorithm that identifies the Named Entity mentions and references to those mentions such as pronouns, and combines the mentions and references such that repeated reference to the same individual entity are grouped together.

Sentiment—A writer's feelings towards his topics, where topics are often the document to as a whole, as well as Named Entities, important themes, and subtopics. The feelings are often refined to a simple positive/neutral/negative classification, a continuum between positive and negative, multidimensional axes representing sentiment directions and strength of opinion, or multidimensional axes representing different emotions such as anger, happiness, and excitement.

Sentiment Recognizer—A Text Analytics Algorithm for identifying Sentiment in a document, either at a whole document level or as applied to other entities detected by other Text Analytics Algorithms. At its core, a Sentiment Recognizer often has an explicit or implicit (part of a trained model) list of phrases that influence sentiment, and this list is often obtained, at least partially, through automated machine learning techniques.

Sentiment Assigner—A Text Analytics Algorithm that operates as part of a Sentiment Recognizer for identifying the scope of sentiment bearing phrases. Besides identifying which phrases convey sentiment, it is desirable for a Sentiment Recognizer to understand which entities and other Text Analytics elements each sentiment phrase affects. For example, in the sentence "I love Coke but hate Pepsi" it is desirable that love be applied only to the entity Coke and hate only to the entity Pepsi.

Pointwise Mutual Information—A statistical measure quantifying the discrepancy between the probability of the coincidence of two variables given their joint distribution and the probability of their coincidence given their individual distributions assuming independence, calculated as $$\log \frac{p(x, y)}{p(x)p(y)}.$$

Dictionary—A hand built or computer generated list of terms or phrases, optionally connected to additional metadata, used to provide language knowledge to a Text Analytics Algorithm.

Sentiment Dictionary—A dictionary of terms or phrases having some sort of sentiment polarity.

Intensifier Dictionary—A dictionary of terms or phrases that imply a different weighting to sentiment phrases connected to the term, or phrase. For example, the term "very" is used as an intensifier, increasing the weight of terms that follow it ("very good" being stronger language than just "good"). As used herein and throughout, "intensifiers" is an inclusive term for any modifier, including ones that reduce the weight of following terms such as "merely".

Negation Dictionary—A dictionary of terms or phrases, potentially combined with metadata explaining usage, for terms like "not" that invert the meaning of other terms.

Trie—A data structure useful for storing text, also referred to as a prefix tree, for storing information made up of ordered elements from a finite set, for example words made up of an ordered string of characters. In a trie, nodes do not store their key, instead the edges store the element of the set needed to get from the previous node to the next one, such that the set of edges traversed to get to a node define the series of elements that make up that key.

Text Analytics Metadata—The output of Text Analytics Algorithm intended for consumption by users of the algorithm or for processing by other algorithms. These are computer determined facts or views about a document, such as what the sentiment of the document is, what the summary is, etc.

Secondary Metadata—The application of one Text Analytics metadata to another, for example a Text Analytics Engine may produce sentiment, Named Entities and as secondary metadata the sentiment for each Named Entity.

Topic—A specific subject of discussion within a document.

Topic Query—A definition, often following some established syntax, for the context that implies discussion of a particular topic. A topic query will generally establish the vocabulary of a domain, grouping them into minimal sets of keywords expected to establish that a topic is being discussed and provide exceptions to exclude other topics that share similar keywords or homonyms of the keywords.

Boolean Query—A common family of query syntaxes where words and phrases are considered as "true" or "false" based on their presence or absence in a document, and logical operators such as AND, OR and NOT are used in conjunction with the words and phrases to express topic queries.

Semantic Matrix—A matrix with words and phrases as the rows and some unit of meaning as the columns, where the rows are Semantic Vectors that can be extracted for any word or phrase present and vector operations can be performed on these Semantic Vectors to build up meaning for larger pieces of text via combination of the individual Semantic Vectors, and vector similarity measures can be used to compare arbitrary pieces of text.

Semantic Vector—A vector representing a point in a many-dimensional space used to represent the implicit meaning in the text used to generate the vector.

TF-IDF—Acronym for Term Frequency-Inverse Document Frequency, a statistic that measures the importance of a term to a document within a larger corpus of documents. Let tf(t,d) be the number of times term t appears in document d, |D| be the size of the corpus and c(t,D) be the count of documents containing term t in the corpus D. Then $$tf\text{-}idf(t, d, D) = tf(t, d) * \log\left(\frac{|D|}{n + c(t, D)}\right)$$

where n is a constant, usually 1 or 0.

LSA—Acronym for Latent Semantic Analysis, a technique for building a semantic matrix where word counts or tf-idf values per unit of text (usually documents or paragraphs) in a corpus of representative documents are used to build an initial matrix with words as rows and the units of text are the columns and then singular value decomposition is used to reduce the number of columns in a way that captures the "latent concepts" that explain the co-occurrences of words.

Singular Value Decomposition—A matrix operation to decompose a matrix X into three matrices, such that $X=U\Sigma V^T$, where U and V are Orthogonal and $\Sigma$ is a diagonal matrix.

ESA—Acronym for Explicit Semantic Analysis (in contrast with Latent Semantic Analysis), which begins like LSA in generating a semantic matrix of word counts or tf-idf values per unit of text (usually documents or paragraphs) in a corpus of representative texts, but does not decompose the matrix or reduce its rank, but rather uses this primary matrix directly as the semantic matrix.

Cosine Similarity—A measure of similarity between two vectors defined as the cosine of the angle between them. For vectors A and B, the cosine is defined as $$\frac{\sum_{i=1}^{n} A_i \times B_i}{\sqrt{\sum_{i=1}^{n} (A_i)^2} \times \sqrt{\sum_{i=1}^{n} (B_i)^2}}.$$

I. First Exemplary Embodiment

A. Hashtag Sentiment

Twitter has started a unique linguistic trend of tagging messages with a hashtag, a word or concatenation of words following a hash (#) symbol. This technique began as a way of identifying key ideas in a tweet in order to facilitate the linking of related tweets. This usage has spread to other social mediums where the hashtag has lost its technical role in connecting related tweets and instead has become both a shorthand way of highlighting an idea, or referencing the running discussions present on Twitter.

Because Twitter imposes a tight constraint of 140 characters per message, the hashtag has taken on additional linguistic properties. In one instance, a hashtag will be used to imply the subject of a message where an explicit statement would be too long, such as in this tweet: "I've got an obsession, not an addiction #starbucks". In another case, the roles are switched and an entity will be mentioned by name, but the ideas being expressed will be condensed into hashtags, such as this tweet: "I can't believe American Airlines. #annoyed #longwaits" The complaint (long waits) may be difficult to fit into an additional sentence within the character limit, but social media conventions make clear that the author is explaining that he is annoyed by a long waiting experience in conjunction with American Airlines. #longwaits reveals another common and important property of hashtags: the use of run-on words to express complex ideas. While traditional sentiment techniques often use dictionaries of sentiment bearing terms, such that longwaits could be expressly assigned a negative score, the inventive algorithm finds the likely breaks intended within a hashtag and processes the expanded phrase, "long waits".

B. Word Expansion for Emphasis

When speaking, tone and inflection are used to emphasize the strength of sentiment implied: contrast "it's pretty good" where the first syllable of 'pretty' is emphasized, implying reservations with "it's pretty good" where 'pretty' and 'good' are both emphasized, implying admiration. Written text does not have a common way of expressing small tonal differences, and so generally makes do either with less ambiguous phrasings of sentiment or longer sentences that provide multiple clues to the reader for better understanding. However, the terse nature of social media content can make fitting in multiple clues or expressive language difficult. An important development in communication through this medium is the development of a common usage of extra letter repetitions, generally vowels, as a marker of emphasis. Traditionally, "love" might be emphasized using the phrase "really love", while in social media "looove" might be used instead, saving 5 characters. The inventive algorithm efficiently parses phrases looking for these expansions and increases either the sentiment weight or the intensification weight of sentiment bearing terms so expanded, in order to more accurately determine the original emphasis intended by the author.

C. Examples

Consider the tweet: "I've got an obsession, not an addiction #starbucks". Following FIG. 1, in an illustrative embodiment such a tweet would be obtained from the internet and possibly stored on local disk. After standard text analytics operations such as tokenization and part of speech tagging, the partially processed tweet is provided to a sentiment recognizer for detection of sentiment bearing phrases. In the example tweet, these would likely be "obsession" and "not . . . addiction", and the sentiment values would depend heavily on the domain and particular sentiment classification scheme, but might be a positive sentiment value such as 0.3 for obsession and a negative sentiment value such as 0.2 for "not . . . addiction". Simultaneously a hashtag detector would scan the list of tokenized words in this tweet for any starting with a hash symbol, returning "#starbucks". "#starbucks" would then have the initial hash removed, and "starbucks" would be provided to the Named Entity Recognizer.

In a normal Named Entity Recognizer, the context of how a phrase is used in a sentence provides significant clues, but hashtags are often grammatically isolated and thus offer fewer clues. In this case, starbucks is not a common word, the only possible splitting of the word into smaller words, "star bucks" is not a common phrase, and Starbucks is a common company. Thus a Named Entity Recognizer can be expected to identify Starbucks as a company.

In normal operations, the grammatical disconnect would make linking the identified sentiment phrases ("obsession" and "not . . . addiction") to Starbucks unlikely. Read grammatically, Starbucks appears like an interjection as opposed to a subject of the text. In the case of hashtags, higher quality results can be obtained by considering hashtags representing entities to be the recipient of all sentiment phrases in a document. As such, both "Starbucks" and the sentiment phrases are provided to the Sentiment Assigner which short-circuits its usual algorithms and assigns Starbucks the full sentiment of both phrases, possibly assigning a sum (0.5) or an average (0.25) of the scores to Starbucks. In a likely embodiment, this assignment of sentiment to Starbucks would be recorded in a database for future reports or by use in a data exploration application.

Figure 2:
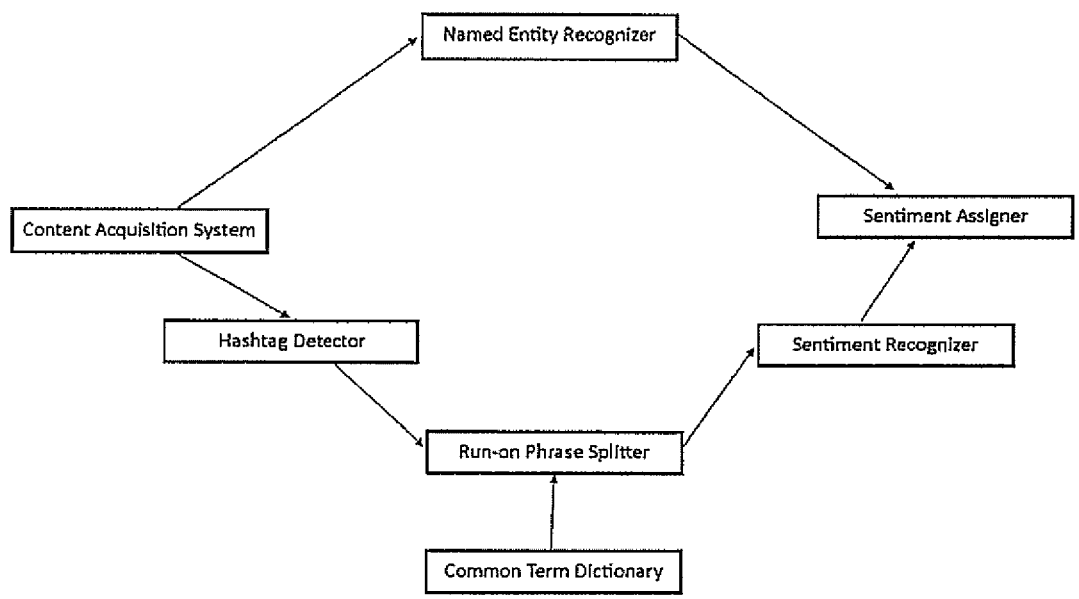

FIG. 2 provides the complementary path taken by an embodiment when a hashtag contains sentiment bearing phrases. Consider the tweet "I can't believe American Airlines. #annoyed #longwaits". Here the tweet, after being obtained from the internet and possibly stored locally, would be run through standard Text Analytics Algorithms such as tokenization and part of speech tagging, and then provided to a Named Entity Recognizer. Here "American Airlines" is a company. Simultaneously a hashtag detector would scan the list of tokenized words in this tweet for any starting with a hash symbol, returning "#annoyed" and "#longwaits". "#longwaits" is not a common word, so would be provided to the Run-on Phrase Splitter. Each letter would be examined in turn in reverse to find complete words within the longer hashtag. "s" is not a word", "ts" is not a word, "its" is a word, and so would induce a branch point in the code. In one branch, the algorithm continues with the assumption that the hashtag ends with the word "its", in the other branch the algorithm assumes that "its" is just the end of a word, and continues looking. If either branch cannot assign every letter to a word, it will give up. The backwards nature of this search is simply an optimization in the branching factor, and in alternative embodiments the algorithm can look up words in forward order.

Continuing, "a its" and "alts" is found in the search. "a its" are both words, so the algorithm jumps to 3 branches. Continuing, "w a its", "wa its" and "waits". "waits" is a word, so a branch is added. Next "gw a its", "gwa its", "g waits", and "gwaits" is found. This condenses the search, as no word ends in "gw", "gwa" or "gwaits", thus any branch containing those entries can be stopped. "g waits" is now all that is left, and processing all remaining letters it becomes evident that no other branching occurs, leaving one possible interpretation: "long waits". "Annoyed" is already a word, and so bypasses the Run-on Phrase Splitter.

A Sentiment Recognizer often takes the context of a possibly sentiment bearing phrase into account, but a hashtag lacks an obvious grammatical relationship to other words, and as such a Sentiment Recognizer can likely only perform simple operations on the phrases. The sentiment values depend heavily on the domain and particular sentiment classification scheme, but might be negative sentiment value such as −0.4 for both "annoyed" and "long waits".

Since the hashtags do not share a discernible grammatical connection to American Airlines, in normal operations of a sentiment assignor it is unlikely for both to be assigned as contributing to American Airlines sentiment. However, the observation that sentiment bearing phrases inside hashtags usually apply their sentiment to all Named Entities (excepting I, if I is being matched as a Named Entity) leads one to provide both "American Airlines" and the sentiment phrases to the Sentiment Assigner, which bypasses standard sentiment assignment and assigns the sentiment phrases to all entities, in this case giving American Airlines some combination of sentiment phrases, in this case potentially sum (−0.4+−0.4=−0.8) or average (−0.4). In a likely embodiment, this assignment of sentiment to American Airlines would be recorded in a database for future reports or by use in a data exploration application.

Figure 3:
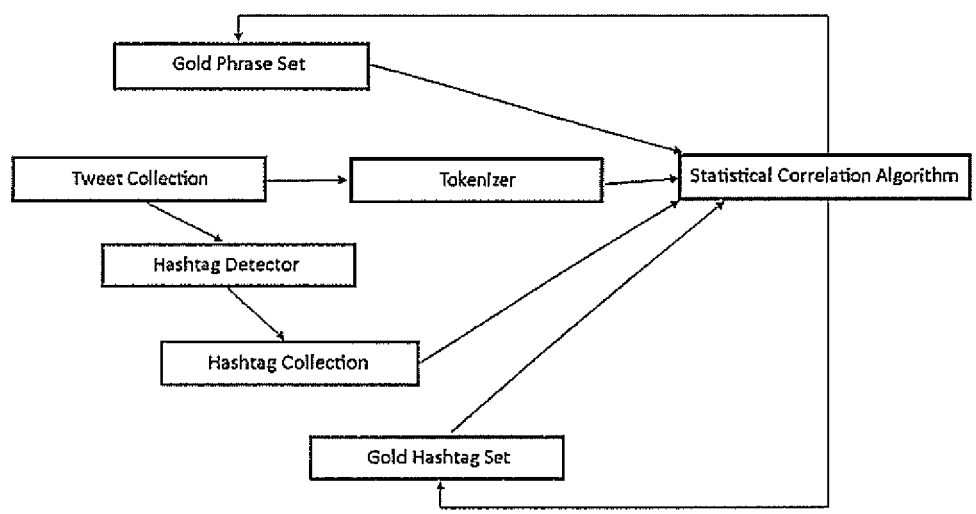

FIG. 3 demonstrates the process of developing complementary sets of sentiment bearing hashtags and phrases for use in a sentiment recognizer. Under a standard process, human annotators would read tweets and either mark the tweet as a whole with a sentiment classification, or identify the individual phrases that bear sentiment for ingestion by a sentiment engine. While effective, this process is expensive in human time use. In an alternative strategy, a very large corpus is analyzed for statistically interesting co-occurrences between phrase and a human defined gold set of clearly sentiment bearing words. As an illustration, any phrases appearing more often than random around the term "wonderful" and less often than random around the word "terrible" would be considered to have a positive orientation. Optionally, the most strongly correlated phrases are then added to the gold set and the process repeated. This process works because of the observation that phrases of a similar sentiment class are more likely than random to appear together in text. However, this rule is certainly not absolute, as contrasting text is not uncommon, for example "Some days I'm happy, some days I'm sad."

Social media sources that use the hashtag custom provide the opportunity to perform a more targeted variant of the automated statistical correlation technique. Consider for example, the hashtag "#annoyed". An author who uses this tag is almost certain to be describing an annoyance. Hence whatever phrases appear in the message are likely to be a source of annoyance, or a descriptor of the sensation. Instead of simply finding word co-occurrences, the inventive algorithm finds phrase-hashtag co-occurrences. The process is otherwise similar to the word co-occurrence statistical correlation technique. A gold set of hashtags is provided, in one embodiment a set of positive and negative hashtags, in another embodiment a more granular classification, such as emotions where "#annoyed" would be one class. Then phrases are statistically linked to these hashtags, other tweets containing the detected phrases are discovered, and the reverse correlation is performed: finding new hashtags that are used around the phrases that were originally discovered as correlated to the original gold set of hashtags. A single pass can be used to seed a list of sentiment hashtags and phrases, or the best matches from the process can become the gold set for a subsequent iteration, repetitions of which provide a larger final set of sentiment hashtags and phrases.

Figure 4:
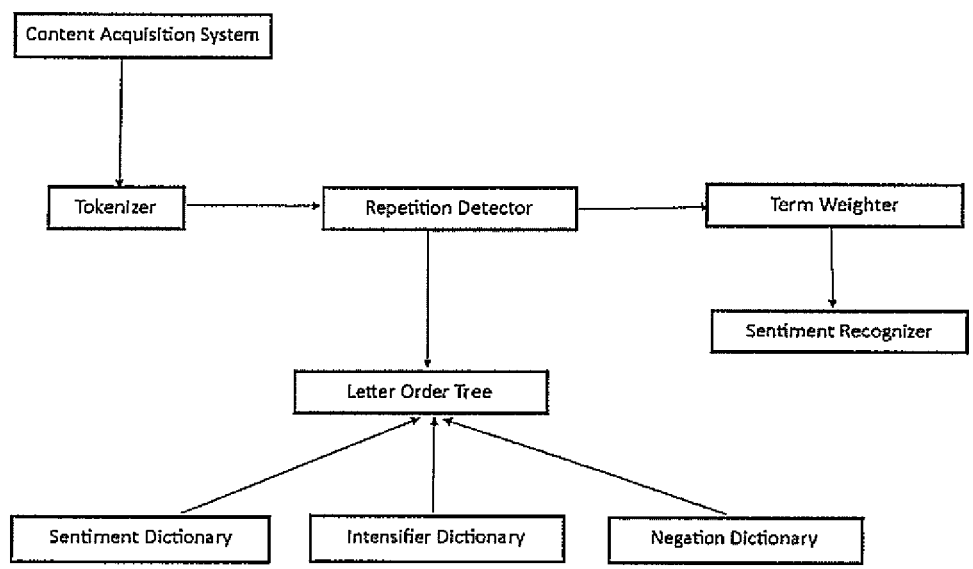

FIG. 4 demonstrates the process of handling expanded phrases in sentiment recognition, an important step in the sentiment algorithms discussed in the present disclosure, as well as general sentiment handling in informal text. Text is obtained via an external source by a Content Acquisition system, and optionally stored on local disk. The text is then broken into words by a Tokenizer, and optionally other Text Analytics Algorithms such as Part of Speech Tagging are run. The individual words obtained from the Tokenizer are then given to a character repetition detector, which has pre-generated a Letter Order Tree from all or a subset of the following system or user provided data files: Sentiment Dictionaries, Intensifier Dictionaries, and Negation Dictionaries. The goal of the Repetition Detector is to determine that a provided word is the same as a Sentiment Dictionary word except with some subset of its letters repeated for emphasis. The Letter Order Tree is a data structure, such as a trie, which contains a starting entry for every letter, with branches from that entry to new entries for every continuation from the previous letter to another letter represented in a dictionary, such that traversal of the data structure by iterating over each letter in a word will end in a leaf node acknowledging the successful matching of a word, and processing of a word that does not exist in the dictionary will cause the arrival at a leaf node declaring the failure of the search at the first point where no word in the dictionary begins with the starting letters of the query term. As an example, "good" and "great" might both appear in a Sentiment Dictionary. They would be processed into the Letter Order Tree as an initial entry "g", with two branches "o" and "r". "o" then branches to "o", and that branches to "d", which node is marked as a complete term. Out of the "r" branch comes a series of single branches, leading in order to "e", "a", then "t", where the "t" node also marks a complete term. If those were the only two terms in the Letter Order Tree, all other possible branches would be marked as fail states, and attempts to enter would return a "could not match" code to the calling software.

When the Repetition Detector looks up a word or phrase in the Letter Order Tree, it handles repeated letters in a special way. Consider lookup of the term "goooood". "g" is straightforward, entering the starting node common to "good" and "great". The first "o" rules out "great", and, therefore, returns travel to the "go" branch. The next letter is a repeated "o". Since the node branches on "a", an ambiguous situation is created, i.e., is this a word with two "o"s, or a word with one "o" that is being repeated? Both theories in code are followed, seeing which interpretation leads to a successful parsing of a word. If both paths lead to an interpretation, the preferred one is that one with fewer repetitions, the one that travels down the branch to "o", rather than staying local. Thus one code path leads to "go" with a single repetition, and another code path leads to "goo" with no repetitions.

Next is another "o". In the "goo" path there is no additional "o" branches: equivalently, there were no words in the sentiment dictionary starting with "gooo". Thus the only interpretation in that branch is that this next "o" is a repeated letter. The count of repeated letters in this path in incremented. In the other path, there is a follow-up with another "o". This path could be followed to "goo" without changing the results, but equivalently it can be identified that this path was already traveled when its is decided to repeat this letter, and ignore that branch. In this case two paths remain: "go" with 2 repeated "o" s, and "goo" with 1 repeated "o". The next 2 "o"s follow the same process, so "d" is arrived at with two paths: "go" with o repeated 4 times or "goo" with "o" repeated 3 times.

In the "goo" path there is a branch labeled "d", which leads to a completed word and that corresponds with exhausting the input in the Repetition Detector. Thus one hypothesis the engine generates is that this word is "good" with 3 repeated letters. The other code path would find that "god" was not represented in the original input, and so will stop without returning a hypothesis. If "god" had been a sentiment phrase in the Sentiment Dictionary that would have been a second hypothesis for what this word was, but it would have been rejected in favor of "good", as the engine prefers matches with fewer repetitions.

The Sentiment Dictionary provides some sentiment score for the phrase, the value and appearance of which depends heavily on the sentiment classification scheme being used and the domain of text being analyzed. In this example, we'll assume the Sentiment Dictionary is a simple positive/negative scale and that good has a weight of 0.4. Then the values "0.4" and "3", corresponding to the sentiment weight and repetition count, are provided to a Term Weighter which will perform a mathematical operation on those two values to generate a new weight. In this example we'll assume the Term Weighter multiplies any score with a repetition count greater than 2 by 1.5, generating 0.6 in this instance. "good" and 0.6 are then provided to a Sentiment Recognizer for any further processing, for example the calculation of a total sentiment value based on all sentiment phrases detected in the document and the assignment of sentiment phrases to Named Entities or other metadata in the document.

Phrases can either be entered directly into the Sentiment Dictionary and space treated as a character to match, or the individual words in a sentiment dictionary can be processed through the Letter Order Tree separately.

Figure 5:
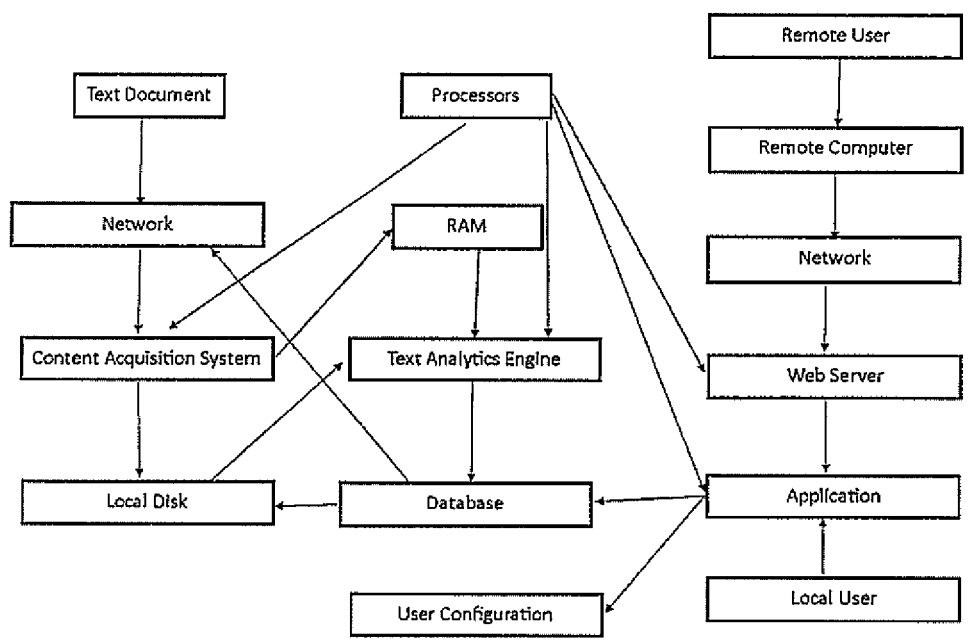

FIG. 5 demonstrates a full embodiment of this invention within a computer system. Text Documents are obtained over a network, generally a LAN or the Internet, by a Content Acquisition System run on one or more Processors on a computer. The Content Acquisition System stores the Text Document in Random Access Memory (RAM) or on a local storage disk, where the Text Analytics Engine being run on one or more processors accesses the text and performs its analysis. FIGS. 1 through 4 show deeper views of what occurs in the Text Analytics Engine, in particular the original material of the invention occurs within this system. The results of the Text Analytics Engine, metadata describing in more structured terms the content of the Tex Document are then generally stored in a Database, possibly on local disk or in a larger network. An Application is then run on one or more processors, accessing the database or other data store, optionally on a different machine than the Text Analytics Engine. The Application may also provide functionality for configuring the Text Analytics Engine, and is used by a human being on the computer, or accessed via a web server on another computer by a remote user across some network, generally a LAN or the Internet.

Exemplary sub-embodiments of the embodiments disclosed above include:

1. Use of a Named Entity Recognizer on the hashtags of a message, where matching Named Entities are assumed to be related to any sentiment bearing terms in the entire message, bypassing standard techniques that attempt to assign sentiment only to Named Entities clearly related to said term, such as those Named Entities sharing a subject verb object relationship with said term.

2. Processing of run-on hashtags to determine the individual terms, the examination of the expanded string for sentiment phrases, and the assignment of the correlated sentiment to Named Entities discovered in the tweet by a Named Entity Recognizer.

3. Processing of run-on hashtags to determine the individual terms, the examination of the expanded string for sentiment phrases, and the assignment of the correlated sentiment to Named Entities discovered in the tweet by a Named Entity Recognizer where sentiment phrases are further annotated with likely entity types, such that tweets containing entities of multiple types (e.g., person and company) can have sentiment assigned only to the entity of the more likely type.

4. Processing of run-on hashtags to determine the individual terms, the examination of the expanded string for sentiment phrases, and the assignment of the correlated sentiment to Named Entities discovered in the tweet by a Named Entity Recognizer, accomplished by a backtracking algorithm that examines the text of a hashtag backwards, examining each span of consecutive letters from the end towards front, and looking up each span in a dictionary of common words reversed, where each dictionary match creates a branching point: in one branch considering the matched terms as a unique word and repeating this process in order to find word matches for all letters in the hashtag, and in the other branch considering the string matched so far as only a portion of a longer word, and continuing the same process until the next branch point, where the first branch that successfully assigns all letters into a known word causes acceptance of that parsing as the correct one, and where no successful groupings of letters into terms causes the entire hashtag to be considered as an individual term.

5. A process whereby a gold set of clearly positive, negative and neutral hashtags are collected, the tweets containing these hashtags are collected, an algorithm is used to determine statistically significant correlations between terms in the tweets and an individual sentiment categories in order to generate candidate sentiment phrases, these sentiment phrases then being run against a larger set of tweets to find statistical correlation between the sentiment phrases and certain hashtags, where the most correlated hashtags with each sentiment category are then added to the original gold set and the whole process is repeated iteratively until no new sentiment phrases or sentiment hashtags are discovered.

6. A process whereby a gold set of clearly positive, negative and neutral hashtags are collected, the tweets containing these hashtags are collected, an algorithm is used to determine statistically significant correlations between terms in the tweets and an individual sentiment categories in order to generate candidate sentiment phrases, these sentiment phrases then being run against a larger set of tweets to find statistical correlation between the sentiment phrases and certain hashtags, where the most correlated hashtags with each sentiment category are then added to the original gold set and the whole process is repeated iteratively until no new sentiment phrases or sentiment hashtags are discovered, and where statistical correlation is determined by calculation of Pointwise Mutual Information (PMI).

7. Provision of a weighting multiplier to the sentiment polarity of a sentiment bearing term based on the repetition of letters in a word, accomplished by preprocessing a dictionary of terms into a tree such that each letter in a word corresponds to a node in the tree, with subsequent letters in dictionary terms correspond to branchings in the tree and the final leaves of the tree pointing to the term preprocessed, where lookup is accomplished by processing of each letter in a word discovered in a novel text being processed where processing is accomplished by following the branches in the tree corresponding to subsequent letters, except that repeated letters do not follow branches but instead increment a counter recording the number of letters repeated, where the successful arrival at a leaf returns both the term discovered and the letter repetition counter and the letter repetition counter is used to calculate a weight multiplier greater or equal to 1 for the term.

8. Provision of a weighting multiplier to the sentiment polarity of a sentiment bearing term based on the repetition of letters in a word, accomplished by preprocessing a dictionary of terms into a tree such that each letter in a word corresponds to a node in the tree, with subsequent letters in dictionary terms correspond to branchings in the tree and the final leaves of the tree pointing to the term preprocessed, where lookup is accomplished by processing of each letter in a word discovered in a novel text being processed where processing is accomplished by following the branches in the tree corresponding to subsequent letters, except that repeated letters do not follow branches but instead increment a counter recording the number of letters repeated, where the successful arrival at a leaf returns both the term discovered and the letter repetition counter and the letter repetition counter is used to calculate a weight multiplier greater or equal to 1 for the term, and where repeated letters cause the algorithm to both remain at the current node and increment the repetition counter, and separately travel to the next node labeled by the repeated letter if it exists, where of the tree traversals ending at leaf nodes the lowest repetition counter is used. This prevents confusion between terms that differ only by repetition of letters.

9. Provision of a weighting multiplier to the sentiment polarity of a sentiment bearing term based on the repetition of letters in a word, accomplished by preprocessing a dictionary of terms into a tree such that each letter in a word corresponds to a node in the tree, with subsequent letters in dictionary terms correspond to branchings in the tree and the final leaves of the tree pointing to the term preprocessed, where lookup is accomplished by processing of each letter in a word discovered in a novel text being processed where processing is accomplished by following the branches in the tree corresponding to subsequent letters, except that repeated letters do not follow branches but instead increment a counter recording the number of letters repeated, where the successful arrival at a leaf returns both the term discovered and the letter repetition counter and the letter repetition counter is used to calculate a weight multiplier greater or equal to 1 for the term, and where the weighting is proportional to the number of repeated letters.

10. Provision of a weighting multiplier to the sentiment polarity of a sentiment bearing term based on the repetition of letters in a word, accomplished by preprocessing a dictionary of terms into a tree such that each letter in a word corresponds to a node in the tree, with subsequent letters in dictionary terms correspond to branchings in the tree and the final leaves of the tree pointing to the term preprocessed, where lookup is accomplished by processing of each letter in a word discovered in a novel text being processed where processing is accomplished by following the branches in the tree corresponding to subsequent letters, except that repeated letters do not follow branches but instead increment a counter recording the number of letters repeated, where the successful arrival at a leaf returns both the term discovered and the letter repetition counter and the letter repetition counter is used to calculate a weight multiplier greater or equal to 1 for the term, and where the weighting is proportional to the number of repeated letters, and where the proportionality is specifically logarithmic in the number of repeated letters.

11. Provision of a weighting multiplier to the sentiment polarity of a sentiment bearing term based on the repetition of letters in a word, accomplished by preprocessing a dictionary of terms into a tree such that each letter in a word corresponds to a node in the tree, with subsequent letters in dictionary terms correspond to branchings in the tree and the final leaves of the tree pointing to the term preprocessed, where lookup is accomplished by processing of each letter in a word discovered in a novel text being processed where processing is accomplished by following the branches in the tree corresponding to subsequent letters, except that repeated letters do not follow branches but instead increment a counter recording the number of letters repeated, where the successful arrival at a leaf returns both the term discovered and the letter repetition counter and the letter repetition counter is used to calculate a weight multiplier greater or equal to 1 for the term, and where only terms in a whitelist of particular sentiment bearing phrases are used.

12. Provision of a weighting multiplier to the sentiment polarity of a sentiment bearing term based on the repetition of letters in a word, accomplished by preprocessing a dictionary of terms into a tree such that each letter in a word corresponds to a node in the tree, with subsequent letters in dictionary terms correspond to branchings in the tree and the final leaves of the tree pointing to the term preprocessed, where lookup is accomplished by processing of each letter in a word discovered in a novel text being processed where processing is accomplished by following the branches in the tree corresponding to subsequent letters, except that repeated letters do not follow branches but instead increment a counter recording the number of letters repeated, where the successful arrival at a leaf returns both the term discovered and the letter repetition counter and the letter repetition counter is used to calculate a weight multiplier greater or equal to 1 for the term, and where the weighting is proportional to the number of repeated letters, and where the terms in the whitelist correspond with intensifiers, words that increase the emphasis on subsequent words, and the sentiment multiple calculated is provided to the next word in the sentence or the first sentiment phrase containing the next word in the sentence.

13. Provision of a weighting multiplier to the sentiment polarity of a sentiment bearing term based on the repetition of letters in a word, accomplished by preprocessing a dictionary of terms into a tree such that each letter in a word corresponds to a node in the tree, with subsequent letters in dictionary terms correspond to branchings in the tree and the final leaves of the tree pointing to the term preprocessed, where lookup is accomplished by processing of each letter in a word discovered in a novel text being processed where processing is accomplished by following the branches in the tree corresponding to subsequent letters, except that repeated letters do not follow branches but instead increment a counter recording the number of letters repeated, where the successful arrival at a leaf returns both the term discovered and the letter repetition counter and the letter repetition counter is used to calculate a weight multiplier greater or equal to 1 for the term, and where the sentiment bearing terms processed include intensifiers, words and phrases that on their own increase or decrease the weight multiplier of connected sentiment bearing phrases, where repetition of the letters in the intensifier multiply the intensifier weight multiplier by an additional term.

14. Provision of a weighting multiplier to the sentiment polarity of a sentiment bearing term based on the repetition of letters in a word, accomplished by preprocessing a dictionary of terms into a tree such that each letter in a word corresponds to a node in the tree, with subsequent letters in dictionary terms correspond to branchings in the tree and the final leaves of the tree pointing to the term preprocessed, where lookup is accomplished by processing of each letter in a word discovered in a novel text being processed where processing is accomplished by following the branches in the tree corresponding to subsequent letters, except that repeated letters do not follow branches but instead increment a counter recording the number of letters repeated, where the successful arrival at a leaf returns both the term discovered and the letter repetition counter and the letter repetition counter is used to calculate a weight multiplier greater or equal to 1 for the term, and where the sentiment bearing terms processed include negations, words and phrases that on their own invert the weight multiplier of a connected sentiment bearing phrases where repetition of the letters in the negation multiply the negation weight multiplier by an additional term.

II. Second Exemplary Embodiment

In the following examples, the following italicized text is referred to as Document 1:

Regulatory frameworks for the banking industry must balance two competing goals on the incoming side of the ledger. Preservation of capital is a critical issue, as failure to return deposits undermines the economy in a fundamental way and breaks the trust on which a successful system is built upon. However, preservation of capital runs counter to the principal reason people do not simply store wealth in a safe: return on deposits over and above their original amount. Interest can only arise through the productive use of the money, principally via loans. Thus the desire to preserve wealth and the desire to grow it form a fundamental tension for banks.

The following italicized text is referred to as Document 2:

River banks are often envisioned as sandy affairs, but a healthy river will be abutted with ample vegetation. This vegetation serves a similar role to the etymological root of that verb: a buttress, the vegetation holding back the river from horizontal expansion. Root systems provide stability to the granular land and prevent the steady flow of water from eroding the bank. Indeed, with vegetation in place the river may even deposit additional rich soil in the region. When the vegetation goes, the clean boundaries of the river are in trouble.

The process builds off of a query engine, of which there are multiple varieties. In one common implementation, a Boolean query engine, terms and phrases are joined with Boolean operators (such as AND, OR and NOT) and the presence or absence of those terms in a target document are used to evaluate the Boolean operators to arrive at a TRUE or FALSE state, corresponding to a successful or unsuccessful match of the query. Some example queries, and their match status for the example texts are provided in Table 1:

TABLE 1

| Topic | Query | Document 1 | Document 2 |
|---|---|---|---|
| Bank Loans | Bank AND (loan OR mortgage) | Match | Miss |
| Bank Deposits | Bank AND deposit NOT river | Match | Miss |
| Rivers | (River OR stream) AND (water OR sea OR ocean) | Miss | Match |

A second variety of query engine uses a semantic matrix to encode knowledge about the meaning of words, in order to allow queries to be written in more natural, human language rather than specialized Boolean queries. In a full implementation as opposed to an example, the Boolean queries presented would need a great deal of expansion. "Stream" has multiple usages (e.g. income stream); "river" has other synonyms (creek) and related words (bridge); and there are other homonyms for "bank" (an incline, slang for money). In many cases it is preferable to trade the precision of a Boolean query for the simplicity of a semantic matrix powered natural language query. Table 2 provides an example excerpt from an ESA matrix, a real instantiation of which would be many orders of magnitude larger:

TABLE 2

| Term | Article 1 | Article 2 | Article 3 | Article 4 | Article 5 | ... |
|---|---|---|---|---|---|---|
| Bank | 3 | 1 | 3 | 2 | 3 | ... |
| River | 0 | 4 | 3 | 0 | 1 | ... |
| Loan | 1 | 0 | 0 | 0 | 3 | ... |
| Deposit | 1 | 0 | 1 | 2 | 2 | ... |
| Principal | 0 | 0 | 0 | 4 | 2 | ... |
| ... | ... | ... | ... | ... | ... | ... |

Each cell contains some measure of how significant the specified term or phrase was in a particular article. The observation powering the ESA algorithm is that terms that have semantic links tend to appear together in text. Despite significant noise in the term distribution of articles (for example article 5 discusses both a river and loans in the context of bank, possibly because of a bank named for a local river, or a loan for development of a river) across a large corpus meaningless correlations tend to average out.

Table 3 depicts example Semantic Matrix powered topic queries, and their scores for the sample documents.

TABLE 3

| Topic | Query | Document 1 | Document 2 |
|---|---|---|---|
| Bank Loans | Bank Loans | 0.8 | 0.2 |
| Bank Deposits | Bank Deposits | 0.7 | 0.35 |
| Rivers | River, Stream | 0.1 | 0.8 |

The process involved selects the rows from the query in the semantic matrix and combines them in some fashion, such as, e.g., a summation and normalization. It does likewise with the documents, potentially use syntactic clues to guide the combination of vectors. In the simplest schemes, all words and possibly bigrams from a document are simply selected from the semantic matrix and summed together. With semantic vectors thus produced, the cosine angle between the vectors gives a similarity measure, which can be checked against a threshold to determine matching. The continuous nature of an angle means that the topics for a particular document can be ranked relatively easily, unlike a Boolean query which evaluates to a binary divide.

Figure 6:
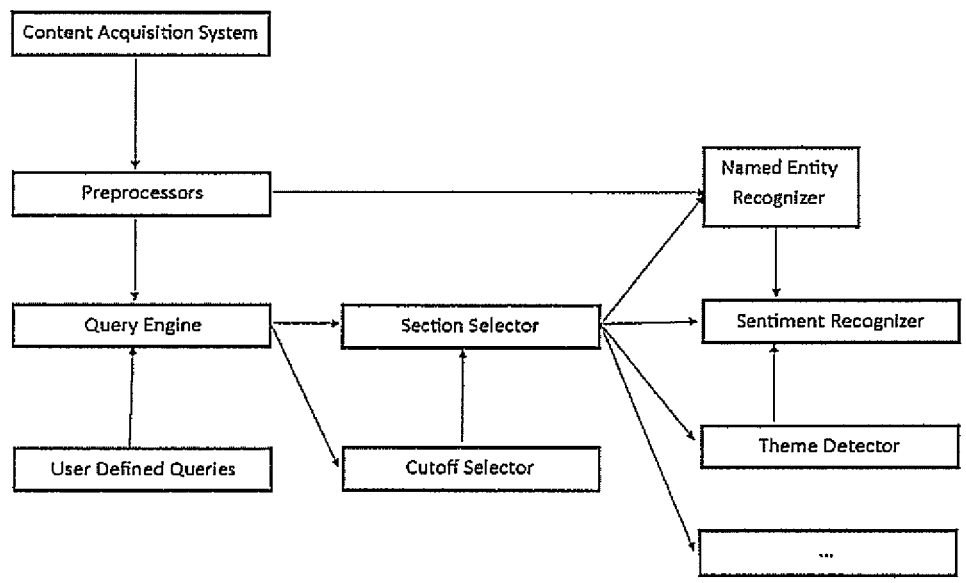
FIGS. 6 and 7 are diagrams depicting exemplary pathways for analyzing text per another exemplary embodiment.

FIG. 6 demonstrates an exemplary inventive process. Referring to FIG. 6, a document is obtained from a network by a Content Acquisition System and optionally stored on local disk. Industry standard algorithms may be used to process the text into data structures more appropriate for further processing, such algorithms generally comprising tokenization, stemming and part of speech tagging. A query engine is run over the document against user defined queries to identify the topics matching the document, and metadata about the match is created. In the case of Boolean queries, this metadata includes the individual words in the document that caused a match. In the case of Semantic Matrix queries, this metadata includes the score measuring the strength of each match as well as the strength of each match against smaller units of text making up the document, generally, e.g., sentences or sentence clauses. This metadata may be provided to a Cutoff Selector, an algorithm that will take into account the metadata provided for all matches, wherein the cutoff selector, combined with user configurations, fixed configurations or information from a representative text corpus, may create a cutoff score for use by the Section Selector.

An example of cutoff selection for a Boolean query comprises taking a tf-idf measurement for each positive term in each query (ignoring terms following a NOT) against the document, sorting these scores, then starting from the highest score and moving towards the lowest score. The resulting score may be compared to the score a fixed distance down in the ranking. For example, the distance of 5 might be used and the top score would be compared to the $6^{th}$ score, the $2^{nd}$ score compared to the $7^{th}$, the $3^{rd}$ score compared to the $8^{th}$, until the latter score examined is the last item in the ranking or until the cutoff criteria is determined. The cutoff criteria may be a drop of a fixed percentage, for example, 50%. That is, if the top score is 20 and the $6^{th}$ score is 15, the cutoff criteria has not been matched. But if the $8^{th}$ score is 14 and the $13^{th}$ score is 2, the drop is larger than the fixed percentage and the $8^{th}$ score of 14 becomes the cutoff. If the criteria is not hit, a cutoff of 0 may be used.

This process, then, finds discontinuities in scores, places where there is a sudden drop in significance. A continuous distribution implies that each term is contributing something, but a sharp drop-off implies that the terms before the drop-off are much more important than the terms after. Alternates of this algorithm also may be used. Such alternatives, include, for example, starting at a fixed point in the list to avoid too drastic of cutoffs, using a fixed cutoff, calculating a cutoff as the lower quintile of scores, and the like. With a Semantic Matrix, rather than tf-idf scores for terms, the semantic similarity of the terms may be used, either against the document or against units within the document such as sentences.

The Section Selector now operates on the metadata provided by the Query Engine and the cutoff provided by the cutoff selector. In the case of a Boolean Query engine, in one implementation, all terms with an associated score, such as tf-idf against the document, falling below the cutoff may be thrown out. In another implementation, the score may be measured for each occurrence of the term in the document against some unit of text, such as a paragraph or sentence in the document, and individual instances of words not scoring as important to that unit of text are ignored. In the former case, the remaining terms may be then matched in the document to obtain the specific units of text where they appear. In the latter case, that matching has already occurred. Now, for each topic there are a set of sentence units containing the terms that define each topic. Consider Document 1, assuming stemming has been used to match terms like "banking" to "bank" and that a cutoff of zero was applied and that the text unit is the sentence, then the following summary texts for each topic may be found:

Bank Loans: Regulatory frameworks for the banking industry must balance two competing goals on the incoming side of the ledger. Interest can only arise through the productive use of the money, principally via loans. Thus the desire to preserve wealth and the desire to grow it form a fundamental tension for banks.

Bank Deposits: Regulatory frameworks for the banking industry must balance two competing goals on the incoming side of the ledger. Preservation of capital is a critical issue, as failure to return deposits undermines the economy in a fundamental way and breaks the trust on which a successful system is built upon. However, preservation of capital runs counter to the principal reason people do not simply store wealth in a safe: return on deposits over and above their original amount. Thus the desire to preserve wealth and the desire to grow it form a fundamental tension for banks.

Rivers: (No match)

A Chainer may optionally be used after the initial selection to pull in related ideas. That is, once the primary text units are discovered, other text units having identical words or related words, where relation is determined, e.g., with a thesaurus or semantic matrix, may be added to the selection. In the case of semantic matrix queries, this process of identifying related words to pull in text units may occur against the query itself, rather than an initial seeding of exact matches, since the semantic matrix query does not require exact matches to produce a strong topic match. In either case, the Section Selector has broken a document into smaller pieces for each topic, and optionally included weight scores for each text unit depending on how important it is to the match, which can be factored into later calculations. For brevity, the example texts provided herein were short, and thus the two matching topics both contain most of the document; however, in longer texts, each topic may match drastically different content.

These sections, and in some instances the entire original document, may be provided to the Text Analytics Algorithms making up a Text Analytics engine. The entire document may be needed for processes like Named Entity Recognition, where a subset of the document may refer to a person only by "he", while the person's name appears in an early part of the document that may have been removed. Thus in some cases it is necessary to run an algorithm on the original document and then select the relevant information, while in other cases it may be sufficient to run the algorithm only on the selection. This will also be dependent on the text unit in use: a clausal selection may not work well with algorithms assuming complete sentences.

Separate metadata can now be provided for each topic as well as the entire document. For sentiment: in the Bank Loans example "productive use of the money" appears, which is likely to be considered a positive. In the Bank Deposits example the phrases "undermines the economy" and "breaks the trust" appear, which are likely to be negative. Thus in one instantiation, the Bank Loans topic will be considered more positively. In a more advanced instantiation, the text "failure to return deposits" will be parsed to imply this is a negation of the topic, and thus the negative phrases in Bank Deposits will be inverted or reduced. With another algorithm, Theme Detection, Bank Deposits could be linked with "preservation of capital" and "original amount" and Bank Loans could be linked with "productive use". For themes that both may be linked to, such as "regulatory frameworks" the secondary metadata, such as whether the article is positive or negative towards "regulatory frameworks" may vary based on the particular text selected.

This information may be provided to consuming algorithms or end users, possibly returned via an API to other code for consumption, displayed on a webpage in graphical format, stored in a database for future processing, and the like.

There are two primary ways of grouping the metadata: topic-centric and entity-centric. In the topic centric view, the primary axis of data is the topic matched, in the example case Bank Loans, Bank Deposits and Rivers. From a structure for each topic, Text Analytics Metadata may be connected, such that shared data is present in multiple topics, preferably, as a theme of "regulatory frameworks" existing as a separate object below each topic. Alternatively, a single primary data structure can exist for each piece of Text Analytics Metadata. In such a case, there may be, e.g., one theme "regulatory frameworks" and another theme "productive use". The "productive use" theme may have a child data structure, i.e., Bank Loans, and "regulatory frameworks" may have two children data structures, i.e., Bank Loans and Bank Deposits. These topic data structures may include information about the specific values associated with the metadata in that context. Although both views may be equivalent, they support differing analyses of the data more easily.

Figure 7:
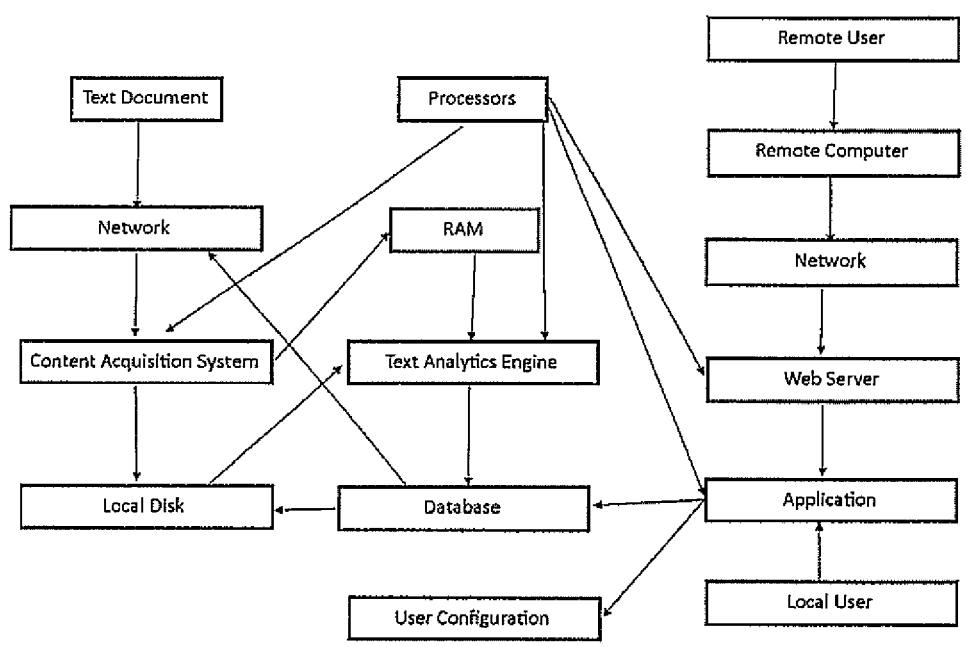

FIG. 7 demonstrates a full embodiment of the invention within a computer system. Text Documents may be obtained over a network, e.g., a LAN or the Internet, by a Content Acquisition System run on one or more Processors on a computer. The Content Acquisition System may store the Text Document in Random Access Memory (RAM) or on a local storage disk, where the Text Analytics Engine being run on one or more processors may access the text and perform its analysis. FIG. 6 shows a deeper view of what occurs in the Text Analytics Engine, in particular the original material of the invention occurs within this system. The results of the Text Analytics Engine, metadata describing in more structured terms the content of the Text Document, may be generally stored in a Database, possibly on local disk or in a larger network. An Application may then be run on one or more processors, accessing the database or other data store, optionally on a different machine than the Text Analytics Engine. The Application may also provide functionality for configuring the Text Analytics Engine, and may be used by a human being on the computer, or accessed via a web server on another computer by a remote user across some network, such as, for example, a LAN or the Internet.

Exemplary sub-embodiments of the embodiments disclosed above include:

1. A method for providing text analytics metadata at the resolution of topics within a document achieved by providing a text analytics engine with a list of topic queries and a document where the engine then performs its regular metadata extraction procedures on the document and performs topic identification based on the provided topic queries, then identifies the sentences most highly correlated with each matching topic, then optionally expands this set of sentences with other sentences closely matching the original set of sentences via a semantic similarity metric, and then provides for each topic the metadata occurring only in the selected sentences and optionally recomputes secondary metadata on the first set of metadata only within the selected sentences.

2. A method for providing text analytics metadata at the resolution of topics within a document achieved by providing a text analytics engine with a list of topic queries and a document where the engine then performs its regular metadata extraction procedures on the document and performs topic identification based on the provided topic queries, then identifies the sentences most highly correlated with each matching topic, then optionally expands this set of sentences with other sentences closely matching the original set of sentences via a semantic similarity metric, and then provides for each topic the metadata occurring only in the selected sentences and optionally recomputes secondary metadata on the first set of metadata only within the selected sentences, where topics queries are Boolean queries and the selected sentences are any sentences containing the terms used in the query.

3. A method for providing text analytics metadata at the resolution of topics within a document achieved by providing a text analytics engine with a list of topic queries and a document where the engine then performs its regular metadata extraction procedures on the document and performs topic identification based on the provided topic queries, then identifies the sentences most highly correlated with each matching topic, then optionally expands this set of sentences with other sentences closely matching the original set of sentences via a semantic similarity metric, and then provides for each topic the metadata occurring only in the selected sentences and optionally recomputes secondary metadata on the first set of metadata only within the selected sentences, where topics are defined as Boolean queries and where a cutoff is used in conjunction with a term density metric to determine the select sentences.

4. A method for providing text analytics metadata at the resolution of topics within a document achieved by providing a text analytics engine with a list of topic queries and a document where the engine then performs its regular metadata extraction procedures on the document and perfoinis topic identification based on the provided topic queries, then identifies the sentences most highly correlated with each matching topic, then optionally expands this set of sentences with other sentences closely matching the original set of sentences via a semantic similarity metric, and then provides for each topic the metadata occurring only in the selected sentences and optionally recomputes secondary metadata on the first set of metadata only within the selected sentences, where topics are defined as Boolean queries and where a cutoff is used in conjunction with a term density metric to determine the select sentences, and where the term density metric is tf-idf calculated against a sample corpus, where the sample corpus is a collection of documents similar to the one being processed.

5. A method for providing text analytics metadata at the resolution of topics within a document achieved by providing a text analytics engine with a list of topic queries and a document where the engine then performs its regular metadata extraction procedures on the document and performs topic identification based on the provided topic queries, then identifies the sentences most highly correlated with each matching topic, then optionally expands this set of sentences with other sentences closely matching the original set of sentences via a semantic similarity metric, and then provides for each topic the metadata occurring only in the selected sentences and optionally recomputes secondary metadata on the first set of metadata only within the selected sentences, where topics are defined as Boolean queries and where a cutoff, which is user provided, is used in conjunction with a term density metric to determine the select sentences.

6. A method for providing text analytics metadata at the resolution of topics within a document achieved by providing a text analytics engine with a list of topic queries and a document where the engine then performs its regular metadata extraction procedures on the document and performs topic identification based on the provided topic queries, then identifies the sentences most highly correlated with each matching topic, then optionally expands this set of sentences with other sentences closely matching the original set of sentences via a semantic similarity metric, and then provides for each topic the metadata occurring only in the selected sentences and optionally recomputes secondary metadata on the first set of metadata only within the selected sentences, where topics are defined as Boolean queries and where a cutoff is used in conjunction with a term density metric to determine the select sentences, where the cutoff is determined by discontinuities in the ranked scores of all sentences, where the discontinuity is defined as a drop of more than a user configurable percentage between sentences of a fixed rank difference, any sentences ranked higher than the lower pair of sentences demonstrating the discontinuity are used and all sentences are used if no discontinuity is detected.

7. A method for providing text analytics metadata at the resolution of topics within a document achieved by providing a text analytics engine with a list of topic queries and a document where the engine then performs its regular metadata extraction procedures on the document and performs topic identification based on the provided topic queries, then identifies the sentences most highly correlated with each matching topic, then optionally expands this set of sentences with other sentences closely matching the original set of sentences via a semantic similarity metric, and then provides for each topic the metadata occurring only in the selected sentences and optionally recomputes secondary metadata on the first set of metadata only within the selected sentences, where topics are defined as Semantic Vectors derived from a Semantic Matrix such as LSA or ESA, such that the user can provide a listing of terms, and the Semantic Matrix is used to represent the terms as a Semantic Vector, each sentence being calculated into a Semantic Vector by the Semantic Matrix, the similarity between the topic vector and each sentence vector being calculated, and sentences corresponding to similarity measures above a particular score being used as the selected sentences.

8. A method for providing text analytics metadata at the resolution of topics within a document achieved by providing a text analytics engine with a list of topic queries and a document where the engine then performs its regular metadata extraction procedures on the document and performs topic identification based on the provided topic queries, then identifies the sentences most highly correlated with each matching topic, then optionally expands this set of sentences with other sentences closely matching the original set of sentences via a semantic similarity metric, and then provides for each topic the metadata occurring only in the selected sentences and optionally recomputes secondary metadata on the first set of metadata only within the selected sentences, where topics are defined as Semantic Vectors derived from a Semantic Matrix such as LSA or ESA, such that the user can provide a listing of terms, and the Semantic Matrix is used to represent the terms as a Semantic Vector, each sentence being calculated into a Semantic Vector by the Semantic Matrix, the similarity between the topic vector and each sentence vector being calculated, and sentences corresponding to similarity measures above a particular score being used being used as the selected sentences, where the similarity between vectors is calculated as the cosine similarity between them.

9. A method for providing text analytics metadata at the resolution of topics within a document achieved by providing a text analytics engine with a list of topic queries and a document where the engine then performs its regular metadata extraction procedures on the document and performs topic identification based on the provided topic queries, then identifies the sentences most highly correlated with each matching topic, then optionally expands this set of sentences with other sentences closely matching the original set of sentences via a semantic similarity metric, and then provides for each topic the metadata occurring only in the selected sentences and optionally recomputes secondary metadata on the first set of metadata only within the selected sentences, where topics are defined as Semantic Vectors derived from a Semantic Matrix such as LSA or ESA, such that the user can provide a listing of terms, and the Semantic Matrix is used to represent the terms as a Semantic Vector, each sentence being calculated into a Semantic Vector by the Semantic Matrix, the similarity between the topic vector and each sentence vector being calculated, and sentences corresponding to similarity measures above a particular score being used being used as the selected sentences, and further comprising a cutoff which is user provided.

10. A method for providing text analytics metadata at the resolution of topics within a document achieved by providing a text analytics engine with a list of topic queries and a document where the engine then performs its regular metadata extraction procedures on the document and performs topic identification based on the provided topic queries, then identifies the sentences most highly correlated with each matching topic, then optionally expands this set of sentences with other sentences closely matching the original set of sentences via a semantic similarity metric, and then provides for each topic the metadata occurring only in the selected sentences and optionally recomputes secondary metadata on the first set of metadata only within the selected sentences, where topics are defined as Semantic Vectors derived from a Semantic Matrix such as LSA or ESA, such that the user can provide a listing of terms, and the Semantic Matrix is used to represent the terms as a Semantic Vector, each sentence being calculated into a Semantic Vector by the Semantic Matrix, the similarity between the topic vector and each sentence vector being calculated, and sentences corresponding to similarity measures above a particular score being used as the selected sentences, and further comprising a cutoff where the cutoff is determined by discontinuities in the ranked scores of all sentences, where the discontinuity is defined as a drop of more than a user configurable percentage between sentences of a fixed rank difference, any sentences ranked higher than the lower pair of sentences demonstrating the discontinuity are used and all sentences are used if no discontinuity is detected.

11. A method for providing text analytics metadata at the resolution of topics within a document achieved by providing a text analytics engine with a list of topic queries and a document where the engine then performs its regular metadata extraction procedures on the document and performs topic identification based on the provided topic queries, then identifies the sentences most highly correlated with each matching topic, then optionally expands this set of sentences with other sentences closely matching the original set of sentences via a semantic similarity metric, and then provides for each topic the metadata occurring only in the selected sentences and optionally recomputes secondary metadata on the first set of metadata only within the selected sentences, where the metadata is sentiment.

12. A method for providing text analytics metadata at the resolution of topics within a document achieved by providing a text analytics engine with a list of topic queries and a document where the engine then performs its regular metadata extraction procedures on the document and performs topic identification based on the provided topic queries, then identifies the sentences most highly correlated with each matching topic, then optionally expands this set of sentences with other sentences closely matching the original set of sentences via a semantic similarity metric, and then provides for each topic the metadata occurring only in the selected sentences and optionally recomputes secondary metadata on the first set of metadata only within the selected sentences, where the metadata is themes, meaningful phrases of two or more nouns or adjectives.

13. A method for providing text analytics metadata at the resolution of topics within a document achieved by providing a text analytics engine with a list of topic queries and a document where the engine then performs its regular metadata extraction procedures on the document and performs topic identification based on the provided topic queries, then identifies the sentences most highly correlated with each matching topic, then optionally expands this set of sentences with other sentences closely matching the original set of sentences via a semantic similarity metric, and then provides for each topic the metadata occurring only in the selected sentences and optionally recomputes secondary metadata on the first set of metadata only within the selected sentences, where the metadata is Named Entities.

14. A method for providing text analytics metadata at the resolution of topics within a document achieved by providing a text analytics engine with a list of topic queries and a document where the engine then performs its regular metadata extraction procedures on the document and performs topic identification based on the provided topic queries, then identifies the sentences most highly correlated with each matching topic, then optionally expands this set of sentences with other sentences closely matching the original set of sentences via a semantic similarity metric, and then provides for each topic the metadata occurring only in the selected sentences and optionally recomputes secondary metadata on the first set of metadata only within the selected sentences, where the secondary metadata is count.

15. A method for providing text analytics metadata at the resolution of topics within a document achieved by providing a text analytics engine with a list of topic queries and a document where the engine then performs its regular metadata extraction procedures on the document and performs topic identification based on the provided topic queries, then identifies the sentences most highly correlated with each matching topic, then optionally expands this set of sentences with other sentences closely matching the original set of sentences via a semantic similarity metric, and then provides for each topic the metadata occurring only in the selected sentences and optionally recomputes secondary metadata on the first set of metadata only within the selected sentences, where the secondary metadata is sentiment.

III. Third Exemplary Embodiment

Disclosed herein is an algorithm for providing a useful explanation for vectors produced by arbitrary operations. The key observation is that while the columns of a semantic matrix are not easily interpretable, the original vectors obtained directly from a semantic matrix tend to correspond directly to words, bigrams or other particular arrangements of terms, and are much more natural for a human to reason over. To represent text, engines incorporating semantic matrices generally perform combining operations on the original vector representations of the terms and n-grams in a document to create a single document vector. Without the proposed algorithm or a variant, such a document vector loses the information about the original contributions of the terms and n-grams observed in the text. Therefore, the present invention includes a "credit matrix" with every semantic vector that describes each column in the document vector as a distribution of original words and n-grams. By maintaining the credit matrix for every vector produced and accurately updating it with each operation, final results can be explained in terms of the original words and phrases involved in the text.

When the original vectors are produced, each simply credits its defining term or phrase with 100% of the reason for each of its column values. When two vectors are combined, the new vector stores the two defining terms or phrases in a data structure, each pointing to an index. That index may be used in a new vector which may be applied orthogonally to every column to describe the relative contributions of the two combined terms. In the case of adding vectors, the sum of each pair of columns is the new column weight, and the credit terms are simply the original weights. With a NOT operator, each column is the weight of the first vector at that column minus the weight of the second vector at that column, and the credit terms are the weight of the original first vector at that column, and the negation of the second vector at that column. In such a way, any vector operation can be performed and an equivalent operation performed on the credit matrix, such that the original contributions can be reconstructed.

Operations such as normalization, dividing every column by a fixed number can be performed without reference to the credit matrix, as the relationship between the contributing terms does not change. The use of the data structure to assign indices to each term ensures that the contribution of the same term through multiple vectors is correctly combined, for more complex operations that reuse the same vector in multiple instances, or in processing documents that contain repeated terms. When combining vectors with their own credit matrices, each column is credited by multiplying the column weight by either the raw credit values or by the percentage contribution of each term. In this way, operations that do not involve a term, such as scaling, can be calculated without reference to the credit matrix while still giving correct contribution values when combined with other matrices.

When an explanation is needed, the total credit of each term may be summed and the top terms may be returned. Optionally, this can be performed while performing another numerical calculation, referencing that calculation's final column weights, in order to see the relative contributions from both operands of that calculation, seeing, for example the document terms and the query terms that led to a match when using the Semantic Matrix for classification.

By separating the credit matrix and actual semantic vector, the former can easily be enabled and disabled to provide explanations when needed, while maintaining runtime performance when not.

Examples

A Semantic Matrix is an encoding of the meaning of words that allows a computer to reason more intelligently about text. Rows in a Semantic Matrix represent words, bigrams or textual patterns, and the columns of a Semantic Matrix represent some unit of meaning, such that rows sharing similar values for a column have some degree of relatedness in meaning. The first step in generating a Semantic Matrix comprises obtaining a training corpus, a set of documents representative of the content that will be processed by the Semantic Matrix. In one use case, the training corpus may include the actual corpus one is interested in understanding better, and the Semantic Matrix is viewed directly to understand the corpus more fully. In another case, the corpus is merely representative, and individual documents within the corpus, or documents external to the corpus, are processed into a vector representation via the Semantic Matrix. This can be used for a number of Text Analytics Algorithms, such as matching natural language queries against documents, understanding the most central sentences or clauses in a document to generate a summary, understanding what content is likely to be about which Named Entities or themes, finding related articles to a given document, and the like.

For this example, a particular model of Semantic Matrices known as ESA is used. In this Semantic Matrix technology, units of text within the training corpus are used directly for the columns, with matrix cells representing a measure of the occurrence or importance of that term to that text unit. The units of text are often sentences, paragraphs or documents. The observation powering the ESA algorithm is that terms that have semantic links tend to appear together in text. Despite significant noise in the term distribution of articles, across a large corpus meaningless correlations tend to average out. The following is an example excerpt from an example ESA matrix, where terms and bigrams are measured against a large set of documents:

| Term | Article 1 | Article 2 | Article 3 | Article 4 | Article 5 | ... |
|---|---|---|---|---|---|---|
| Bank | 3 | 1 | 3 | 2 | 3 | ... |
| River | 0 | 4 | 3 | 0 | 1 | ... |
| Loan | 1 | 0 | 0 | 0 | 3 | ... |
| Deposit | 1 | 0 | 1 | 2 | 2 | ... |
| Principal | 0 | 0 | 0 | 4 | 2 | ... |
| ... | ... | ... | ... | ... | ... | ... |

Vectors may be extracted from this matrix for any present term or bigram. For example, "bank" corresponds to the vector [3,1,3,2,3 . . . ] and "river" to the vector [0,4,3,0, 1, . . . ]. To represent larger segments of text, vectors can be combined in various ways, one simple example being vector addition. Thus an article containing the text "bank, river" may be represented as [3,5,6,2,4, . . . ], a combination of terms unique from both bank and river. More sophisticated representations may also be derived. For example, if another algorithm determines that the best representation for a document also includes a negation of "loan", the vector for that term can be subtracted, resulting in this example as [2,5,6,2,1, . . . ].

One of the primary functions Semantic Vectors support is the comparison of segments of text, often via the cosine similarity measure which uses the cosine of the angle between two vectors to estimate their similarity. This measure has the advantage of being size agnostic: two vectors that are just a scaling operation apart, such as [1,2,3] and [2,4,6] are considered completely matched. This allows the comparison of small pieces of text and long pieces of text without special normalization. The equation for this operation is $$\frac{\sum_{i=1}^{n} A_i \times B_i}{\sqrt{\sum_{i=1}^{n} (A_i)^2} \times \sqrt{\sum_{i=1}^{n} (B_i)^2}},$$

if the left out portions of the example matrix are ignored, the similarity of "bank" and "river" may be calculated as $$\frac{(3*0+1*4+3*3+2*0+3*1)}{\sqrt{3^2+1^2+3^2+2^2+3^2} * \sqrt{0^2+4^2+3^2+0^2+1^2}} = \frac{16}{\sqrt{31} * \sqrt{26}} \cong 0.56.$$

Unfortunately, 0.56 does not provide much information about why the Semantic Matrix considers these two terms as related. The most significant pairings may be found in the numerator, in this case corresponding to Article 3. However, that requires extensive reading on the part of the user without clear reference to what exactly the user is looking for. Additionally, while ESA makes reference to explicit articles, other Semantic Matrices do not. In this particular instance, it may be acceptable to simply state that "river" and "bank" are related to one another. While this works fine for comparison of individual terms, it leaves much to be desired when one or both are actually full documents or sentences. The present invention, then meets the need for a description of the reason why longer pieces of content were matched.

Given a vector, it is not clear what series of operations on which original vectors produced the result. Therefore, with every Semantic Vector a Credit Matrix with sufficient information is included to determine the original content the vector is representing and how important each original vector was to the formation of this final vector. For optimization reasons a Credit Matrix preferably begins empty, with only a reference to the word or phrase that produced it since the entire vector is considered to be credited to that word phrase.

When two vectors are added, the Credit Matrices are preferably combined. For simplicity, assume Vector A is added into Vector B. If Vector B has no Credit Matrix, the entire vector may be set as a row for the Credit Matrix. A Term-Index map may be seeded with the word or phrase that generated Vector B, pointing to index 0, the first row in the Credit Matrix. If Vector A has no Credit Matrix, the same process may be performed. For faster perfolinance these intermediate Credit Matrices can be skipped and the final Credit Matrix built in full. Now each row in Vector A's Credit Matrix is processed in turn. The word or phrase that generated the row may be checked against Vector 13's Term-Index Map. If this word or phrase has been previously used in producing Vector B this will produce an index, and that row of Vector B's Credit Matrix will have this row of Vector A added on. Otherwise this is a new term that may be appended to the end of the Credit Matrix with that index stored in Vector B's Term-Index Map. In the end, Vector A may be added to Vector B, and an accurate representation of the sum of the Vectors is obtained, plus the credit for the values of each column.

A NOT operator can be performed in an identical fashion, except the negated vector is subtracted from the Credit Matrix rather than added.

An OR operator, using the larger value for each column, can be accomplished preferably in one of two manners: either by determining the larger value for each column between the two vectors and using the corresponding Credit Matrix column to give full credit to the larger vector; or by performing the same operation as for an addition in order to give credit proportional to the column weight. This latter operation will result in a Credit Matrix column that does not sum to the corresponding Semantic Vector column; however discrepancies between the two are addressed in the discussion of producing the explanations.

An AND operator, using the smaller value for each column can be accomplished by summing each Credit Column, dividing the larger column by the ratio of the sum of the larger column and the sum of the smaller column, producing columns of the same size, which can then be combined in an analogous fashion to the SUM operation.

Scalar multiples, that is, multiplying a Semantic Vector by a number, can be accomplished without change to the Credit Matrix. This produces a deviation between the sum of each Credit Matrix column and the corresponding Semantic Vector Column, which is handled when producing the explanations.

Another useful operation to perform on two Semantic Vectors is the calculation of the dot-product, which is the sum of corresponding columns multiplied together. In this case the output is not a new vector but a scalar and it is generally more informative to understand the relative contributions of each word and phrase in the Semantic Vectors separately. The dot-product may be used, for example, in the cosine measurements. Understanding each Semantic Vectors prime contributors separately allows one to understand which terms in each original piece of text were most important for producing this match. This calculation of important terms to the dot-product can be carried out by finding all pairs of columns where both vectors have a non-zero weight and multiplying them together to form the relative contribution of that column. Then all the cells in that Credit Matrix's column may be summed to find the total contributions present. By dividing the relative contribution of the Semantic Column by the total weight of the Credit Column a multiplier is formed, which is then multiplied into each of the credit values in that column to find the total importance of that word or phrase to that column's final contribution to the Dot Product.

The end purpose of a Credit Matrix is to give a ranking of the terms and phrases in the text involved in the Semantic Operations to the formation of the final result. This is accomplished by sorting the rows of the credit matrix by the total weight obtained by summing the values in each row. Then the teiius and phrases that deserve the most "credit" for forming this vector can be read in order from the top, and the relative weights can be used for understanding the distribution of importance between the terms and phrases. In a likely application, the top 10 words and phrases are provided in order when a user requests an explanation for the reasoning behind a determination made by a Text Analytics Algorithm using a Semantic Matrix.

FIG. 7 demonstrates the full interaction of components in this invention. A training corpus is used to build a Semantic Matrix, which is fed text of interest to a Text Analytics Algorithm. The Semantic Matrix provides Semantic Vectors and Credit Matrices for the text. A vector recipe, or set of instructions for processing these vectors is followed. This may be a hard coded series of computer steps, the repetition of a simple operator such as summation, or a user configurable series of steps intended to perform some certain task. Essentially, the vector recipe is the means by which a consuming application, algorithm or user specifies what exactly they would like to know. The vector recipe consists of supported vector operations, each of which corresponds to a separate credit operation. The vector operations are performed on the Semantic Vectors derived from the Semantic Matrix, and at each stage the corresponding credit operators are performed on the corresponding Credit Matrices, such that at each stage each active Semantic Vector is connected with a Credit Matrix measuring the contributions of the original terms and phrases through the process of the vector recipe. A Term-Index Map is maintained with each Credit Matrix to ensure that terms or phrases that are repeated in a document or pass through multiple Semantic Vectors in the vector recipe are combined by the credit operators instead of formed into separate rows. At any point in the Vector Recipe, in particular at its completion, an explain function can provide the most important terms and phrases to a final or intermediate calculation by using the Matrix Rank to sort a Credit Matrix by the importance of each row to its full value, and using the Term-Index Map to transform the original row indexes into human readable words and phrases.

Figure 8:
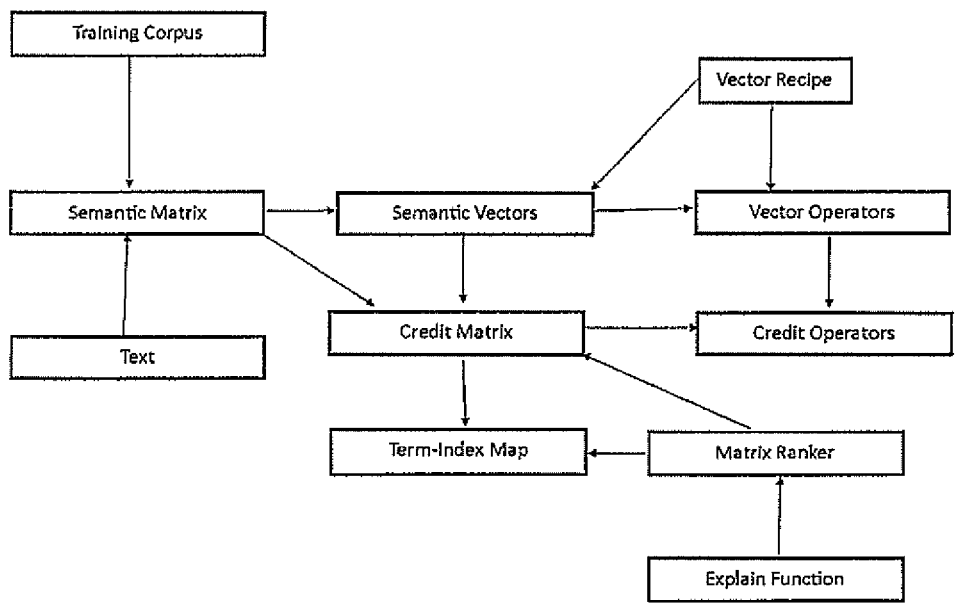
FIGS. 8 and 9 are diagrams depicting exemplary text analysis per another exemplary embodiment.
Figure 9:
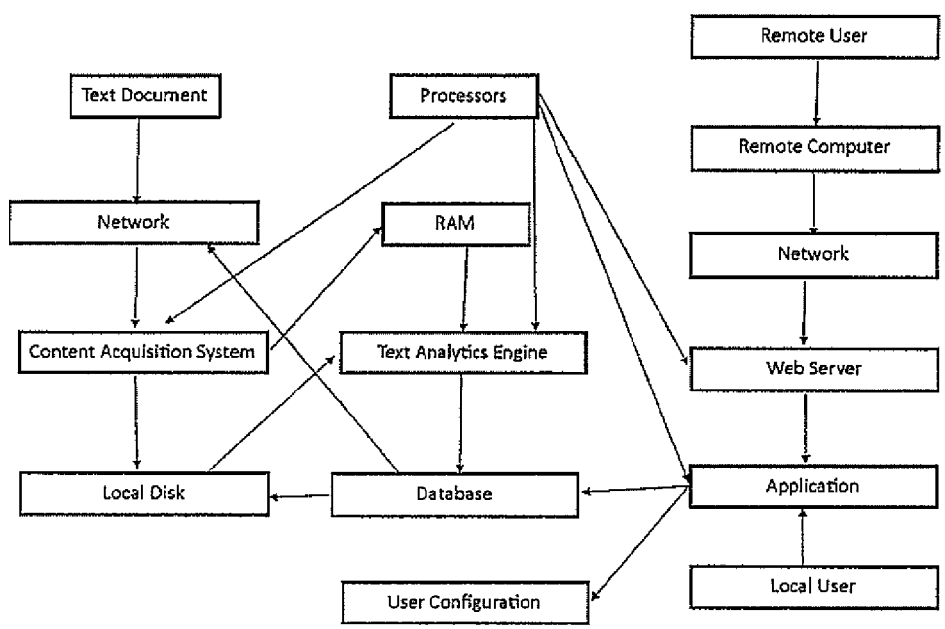

FIG. 8 demonstrates a full embodiment of this invention within a computer system. Text Documents are obtained over a network, generally a LAN or the Internet, by a Content Acquisition System run on one or more Processors on a computer. The Content Acquisition System stores the Text Document in Random Access Memory (RAM) or on a local storage disk, where the Text Analytics Engine being run on one or more processors accesses the text and performs its analysis. FIG. 7 shows a deeper view of what occurs in the Text Analytics Engine, in particular the original material of the invention occurs within this system. The results of the Text Analytics Engine, metadata describing in more structured terms the content of the Text Document are then generally stored in a Database, possibly on local disk or in a larger network. An Application is then run on one or more processors, accessing the database or other data store, optionally on a different machine than the Text Analytics Engine. The Application may also provide functionality for configuring the Text Analytics Engine, and is used by a human being on the computer, or accessed via a web server on another computer by a remote user across some network, generally a LAN or the Internet.

Exemplary sub-embodiments of the above-discussed embodiment include:

1. A method for enhancing the output of a Semantic Matrix by initializing the original constituent vectors representing a document with a credit matrix, assigning full credit for each nonzero weighted column in the vector to the term, n-gram or defined term pattern that generated this vector and applying complementary credit matrix operations for every vector operation used in building compound semantic representations in order to support ranking of original terms, n-grams or defined term patterns by contributions to any semantic calculation.

2. A method for enhancing the output of a Semantic Matrix by initializing the original constituent vectors representing a document with a credit matrix, assigning full credit for each nonzero weighted column in the vector to the term, n-gram or defined term pattern that generated this vector and applying complementary credit matrix operations for every vector operation used in building compound semantic representations in order to support ranking of original terms, n-grams or defined term patterns by contributions to any semantic calculation, where a data structure is used to map contributing terms to indices, and this data structure is referenced in combining any credit matrix in order to ensure that vectors derived from the same text unit in different places contribute as a single unit.

3. A method for enhancing the output of a Semantic Matrix by initializing the original constituent vectors representing a document with a credit matrix, assigning full credit for each nonzero weighted column in the vector to the term, n-gram or defined term pattern that generated this vector and applying complementary credit matrix operations for every vector operation used in building compound semantic representations in order to support ranking of original terms, n-grams or defined term patterns by contributions to any semantic calculation, where a data structure is used to map contributing terms to indices, and this data structure is referenced in combining any credit matrix in order to ensure that vectors derived from the same text unit in different places contribute as a single unit, where said data structure is a hash table.

4. A method for enhancing the output of a Semantic Matrix by initializing the original constituent vectors representing a document with a credit matrix, assigning full credit for each nonzero weighted column in the vector to the term, n-gram or defined term pattern that generated this vector and applying complementary credit matrix operations for every vector operation used in building compound semantic representations in order to support ranking of original terms, n-grams or defined term patterns by contributions to any semantic calculation, where a data structure is used to map contributing terms to indices, and this data structure is referenced in combining any credit matrix in order to ensure that vectors derived from the same text unit in different places contribute as a single unit, where said data structure is a trie.

5. A method for enhancing the output of a Semantic Matrix by initializing the original constituent vectors representing a document with a credit matrix, assigning full credit for each nonzero weighted column in the vector to the term, n-gram or defined term pattern that generated this vector and applying complementary credit matrix operations for every vector operation used in building compound semantic representations in order to support ranking of original terms, n-grams or defined term patterns by contributions to any semantic calculation, where a data structure is used to map contributing terms to indices, and this data structure is referenced in combining any credit matrix in order to ensure that vectors derived from the same text unit in different places contribute as a single unit, where said data structure is a tree.

6. A method for enhancing the output of a Semantic Matrix by initializing the original constituent vectors representing a document with a credit matrix, assigning full credit for each nonzero weighted column in the vector to the term, n-gram or defined term pattern that generated this vector and applying complementary credit matrix operations for every vector operation used in building compound semantic representations in order to support ranking of original terms, n-grams or defined term patterns by contributions to any semantic calculation, where the vector operations include an SUM operator that sums the columns of both vectors and combines the credit matrices directly.

7. A method for enhancing the output of a Semantic Matrix by initializing the original constituent vectors representing a document with a credit matrix, assigning full credit for each nonzero weighted column in the vector to the term, n-gram or defined term pattern that generated this vector and applying complementary credit matrix operations for every vector operation used in building compound semantic representations in order to support ranking of original terms, n-grams or defined term patterns by contributions to any semantic calculation, where the vector operations include scalar multiplication that multiplies every column weight of the vector by a fixed sum, and the net multiplier (possibly achieved via multiple scalar multiplications) is stored until the vector is combined via any operator with any other vector, at which point the credit matrix values are multiplied by the multiplier while calculating the new credit matrix.

8. A method for enhancing the output of a Semantic Matrix by initializing the original constituent vectors representing a document with a credit matrix, assigning full credit for each nonzero weighted column in the vector to the term, n-gram or defined term pattern that generated this vector and applying complementary credit matrix operations for every vector operation used in building compound semantic representations in order to support ranking of original terms, n-grams or defined term patterns by contributions to any semantic calculation, where the vector operations include scalar multiplication that multiplies every column weight of the vector by a fixed sum, and the net multiplier (possibly achieved via multiple scalar multiplications) is stored until the vector is combined via any operator with any other vector, at which point the credit matrix values are multiplied by the multiplier while calculating the new credit matrix, where the multiplier is specifically −1 to achieve a NOT unary operator.

9. A method for enhancing the output of a Semantic Matrix by initializing the original constituent vectors representing a document with a credit matrix, assigning full credit for each nonzero weighted column in the vector to the term, n-gram or defined term pattern that generated this vector and applying complementary credit matrix operations for every vector operation used in building compound semantic representations in order to support ranking of original terms, n-grams or defined term patterns by contributions to any semantic calculation, where the vector operations include an OR operator that takes the larger of the two weights for each semantic column and uses the credit matrix column for each semantic column that corresponds with the larger of the two vectors for that semantic column, or combines both in the cases where the semantic column weights match.

10. A method for enhancing the output of a Semantic Matrix by initializing the original constituent vectors representing a document with a credit matrix, assigning full credit for each nonzero weighted column in the vector to the term, n-gram or defined term pattern that generated this vector and applying complementary credit matrix operations for every vector operation used in building compound semantic representations in order to support ranking of original terms, n-grams or defined term patterns by contributions to any semantic calculation, where the vector operations include AND that uses the smaller of two weights for each semantic column and gives sums the credit matrix columns from each vector then divides the larger credit matrix column by the ratio of the larger column to the smaller column and adds the two columns together, giving equal credit to both semantic columns.

11. A method for enhancing the output of a Semantic Matrix by initializing the original constituent vectors representing a document with a credit matrix, assigning full credit for each nonzero weighted column in the vector to the term, n-gram or defined term pattern that generated this vector and applying complementary credit matrix operations for every vector operation used in building compound semantic representations in order to support ranking of original terms, n-grams or defined term patterns by contributions to any semantic calculation, where the vector operations include DOT-PRODUCT that produces just a credit matrix for one side of the dot product operator accomplished by finding all semantic columns where both vectors have a nonzero weight, multiplying those two weights, producing a multiplier by dividing that product by the sum of all credit rows for that column in the primary semantic vector, then multiplying each of the credit values for this column and row by the multiplier.

12. A method for enhancing the output of a Semantic Matrix by initializing the original constituent vectors representing a document with a credit matrix, assigning full credit for each nonzero weighted column in the vector to the term, n-gram or defined term pattern that generated this vector and applying complementary credit matrix operations for every vector operation used in building compound semantic representations in order to support ranking of original terms, n-grams or defined term patterns by contributions to any semantic calculation, where the Semantic Matrix is the output of the LSA algorithm (latent semantic analysis).

13. A method for enhancing the output of a Semantic Matrix by initializing the original constituent vectors representing a document with a credit matrix, assigning full credit for each nonzero weighted column in the vector to the term, n-gram or defined term pattern that generated this vector and applying complementary credit matrix operations for every vector operation used in building compound semantic representations in order to support ranking of original terms, n-grams or defined term patterns by contributions to any semantic calculation, where the Semantic Matrix is the output of the ESA algorithm (explicit semantic analysis).

What is claimed is:

1. A method for analyzing text, comprising:
   providing a processor on a first computer, wherein the processor runs a content acquisition system to obtain a text document over a computer network, wherein the text document comprises a hashtag immediately preceded by one or more words and immediately followed by one or more words;
   storing the text document obtained from the content acquisition system on a storage device;
   providing a processor on the first computer which runs a text analytics engine, wherein the text analytics engine comprises a hashtag detector, a sentiment recognizer, a named entity recognizer, and a sentiment assignor;
   using the text analytics engine to access the text document and perform an analysis to generate metadata, comprising:
      having the hashtag detector recognize a hashtag and the one or more words immediately following the hashtag;
      having the named entity recognizer identify the one or more words immediately following the hashtag;
      having the sentiment recognizer select words from the one or more words immediately preceding the hashtag which have sentiment;
      assigning the one or more words having sentiment to the one or more words immediately following the hashtag;
      providing a processor on the first computer which runs a weighting multiplier; and
      measuring a repetition of letters in the one or more words having sentiment, comprising:
         preprocessing a dictionary of terms into a tree such that each letter in a word corresponds to a node in the tree, with subsequent letters corresponding to branchings in the tree, and wherein leaves of the tree point to the term preprocessed;
         where lookup is accomplished by processing of each letter in a word discovered in a novel text being processed where processing is accomplished by following the branches in the tree corresponding to subsequent letters, except that repeated letters do not follow branches but instead increment a counter recording the number of letters repeated, where the successful arrival at a leaf returns both the term discovered and the letter repetition counter; and the letter repetition counter is used to calculate a weight multiplier greater or equal to 1 for the term;
   storing the metadata in a database;
   providing a processor from a second computer that runs an application which accesses the database.

2. A method for analyzing text, comprising:
   providing a processor on a first computer, wherein the processor runs a content acquisition system to obtain a text document over a computer network, wherein the text document comprises a hashtag immediately preceded by one or more words and immediately followed by one or more words that form a run-on;
   storing the text document obtained from the content acquisition system on a storage device;
   providing a processor on the first computer which runs a text analytics engine, wherein the text analytics engine comprises a hashtag detector, a sentiment recognizer, a named entity recognizer, and a sentiment assignor;
   using the text analytics engine to access the text document and perform an analysis to generate metadata, comprising:
      having the hashtag detector recognize the hashtag and the run-on;
      having the sentiment recognizer identify individual words that form the run-on and determine whether such word(s) have sentiment, comprising:
         providing a backtracking algorithm; and
         having the backtracking algorithm examine the words immediately following the hashtag in a backwards direction, examining each span of consecutive letters from end to front to create one or more spans, and looking up each span in a dictionary of common words reversed, where each dictionary match creates a branching point, wherein in one branch the matched terms is considered a unique word, and repeating this process in order to find word matches for all of the letters in the one or more words immediately following the hashtag; and wherein in another branch the string matched is considered so far as only a portion of a longer word, and continuing the same process until the next branch point, where the first branch that successfully assigns all letters into a known word causes acceptance of that parsing as the correct one, and where no successful groupings of letters into terms causes the entire hashtag to be considered as an individual term;
      having the named entity recognizer identify the one or more words immediately preceding the hashtag that identify one or more named entities; and
      assigning any one or more of the one or words immediately preceding the hashtag to any one or more of the one or more words identified as having sentiment by the sentiment recognizer;
   storing the metadata in a database; and
   providing a processor from a second computer that runs an application which accesses the database.

* * * * *